US009588244B2

(12) United States Patent
Nemeth et al.

(10) Patent No.: US 9,588,244 B2
(45) Date of Patent: Mar. 7, 2017

(54) PREDICTING INTERBED MULTIPLES IN SEISMIC DATA USING BEAM DECOMPOSITION

(71) Applicants: Tamas Nemeth, San Ramon, CA (US); Sandra Tegtmeier-Last, San Ramon, CA (US); N. Ross Hill, Houston, TX (US); Yue Wang, Sugar Land, TX (US); Peeter Akerberg, Walnut Creek, CA (US); Shoujian Huang, San Ramon, CA (US)

(72) Inventors: Tamas Nemeth, San Ramon, CA (US); Sandra Tegtmeier-Last, San Ramon, CA (US); N. Ross Hill, Houston, TX (US); Yue Wang, Sugar Land, TX (US); Peeter Akerberg, Walnut Creek, CA (US); Shoujian Huang, San Ramon, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 873 days.

(21) Appl. No.: 13/951,108

(22) Filed: Jul. 25, 2013

(65) Prior Publication Data
US 2015/0032378 A1 Jan. 29, 2015

(51) Int. Cl.
*G01V 1/00* (2006.01)
*G01V 9/00* (2006.01)
(Continued)

(52) U.S. Cl.
CPC ............... *G01V 1/30* (2013.01); *G01V 1/36* (2013.01); *G01V 2210/56* (2013.01); *G01V 2210/671* (2013.01)

(58) Field of Classification Search
CPC ........ G01V 1/36; G01V 1/364; G01V 2210/56; G01V 2210/671; G01V 1/30
(Continued)

(56) References Cited

U.S. PATENT DOCUMENTS 7,453,765 B2    11/2008  Kelle
7,715,986 B2 *  5/2010   Nemeth ................. G01V 1/364
                                                    367/24

(Continued)

OTHER PUBLICATIONS

Ikelle, et al., "Scattering diagrams in seismic imaging: More insights into the construction of virtual events and internal multiples" Journal of Applied Geophysics, vol. 67, No. 2 Feb. 1, 2009, 150-170 pgs.
(Continued)

*Primary Examiner* — An Do
(74) *Attorney, Agent, or Firm* — Yalei Sun; Marie L. Clapp

(57) ABSTRACT

A method of attenuating interbed multiples in multiply-reflected seismic waves is performed at a computer system, the method including: providing multiple beams of seismic data and an earth model related to a geological volume; selecting one of the beams as an input beam associated with a pair of source and detector located near a top surface of the geological volume; determining at least one of (i) a source-side stationary pegleg arrival and a corresponding detector-side primary beam and (ii) a detector-side stationary pegleg arrival and a corresponding source-side primary beam; predicting an interbed multiples beam using at least one of (i) the detector-side primary beam delayed by the source-side stationary pegleg arrival and (ii) the source-side primary beam delayed by the detector-side stationary pegleg arrival; and deconvolving the predicted interbed multiples beam with the input beam to remove at least a portion of interbed multiples present in the input beam.

18 Claims, 12 Drawing Sheets

(51) Int. Cl.
   *G01V 1/30* (2006.01)
   *G01V 1/36* (2006.01)
(58) Field of Classification Search
   USPC .......... 702/2, 11, 14, 17, 18; 367/38, 63
   See application file for complete search history.

(56) References Cited

U.S. PATENT DOCUMENTS

| | | | |
|---|---|---|---|
| 8,326,543 B2 * | 12/2012 | Nemeth | G01V 1/364 |
| | | | 702/127 |
| 2008/0294346 A1 | 11/2008 | Nemeth et al. | |
| 2011/0096627 A1 | 4/2011 | Hill | |
| 2011/0125406 A1 | 5/2011 | Nemeth et al. | |

OTHER PUBLICATIONS

N. Ross Hill, et al., "Beam methods for predictive suppression of seismic multiples in deep water", SEG Technical Program Expanded Abstracts, p. 2118, Jan. 1, 1999.

B. Wang, et al., "Multiple prediction by wavefield extrapolation in common-P domain", SEG Technical Program Expanded Abstracts, p. 2441, Jan. 1, 2008.

Ilana Erez, et al., The concept of virtual events: Atteuation of internal multiples, SEG Technical Program Expanded Abstracts 2006, pp. 2714-1716, Jan. 1, 1999.

* cited by examiner

PREDICTING INTERBED MULTIPLES IN SEISMIC DATA USING BEAM DECOMPOSITION

TECHNICAL FIELD

The disclosed implementations relate generally to seismic data processing, and in particular, to systems and methods for predicting interbed multiples in seismic data using beam decomposition.

BACKGROUND

In the petroleum industry, seismic prospecting techniques are commonly used to aid in the search for and the evaluation of subterranean hydrocarbon deposits. The purpose of seismic exploration is to map or image a portion of the subsurface of the earth (a formation) by transmitting energy down into the ground and recording the "reflections" or "echoes" that return from the rock layers below. In general, seismic prospecting consists of three separate stages: data acquisition, data processing and data interpretation. The success of a seismic prospecting operation depends on satisfactory completion of all three stages.

At data acquisition stage, one or more sources of seismic energy emit seismic waves into a subsurface region of interest such as a geologic formation. Seismic exploration typically uses one or more energy sources and typically a large number of sensors or detectors. The sensors that may be used to detect the returning seismic energy are usually geophones (land surveys) or hydrophones (marine surveys). The energy transmitted into the formation is typically sound and shear wave energy. The downward-propagating sound energy may originate from various sources, such as explosions or seismic vibrators on land or air guns in marine environments. Seismic waves enter the formation and may be scattered, e.g., by reflection or refraction, by subsurface seismic reflectors (i.e., interfaces between underground formations having different physical properties). The reflected signals are sampled or measured by one or more detectors, and the resultant data are recorded. The recorded samples may be referred to as seismic data or a set of "seismic traces". The seismic data may be processed and analyzed to extract details of the structure and properties of the region of the earth being explored.

During a surface seismic survey, the energy source may be positioned at one or more locations near the surface of the earth above a geologic structure or formation of interest, referred to as shotpoints. Each time the source is activated, the source generates a seismic signal that travels downward through the earth and is at least partially reflected from discontinuities of various types in the subsurface, including reflections from "rock layer" boundaries. In general, a partial reflection of seismic signals may occur each time there is a change in the elastic properties of the subsurface materials. Reflected seismic signals are transmitted back to the surface of the earth, where they are recorded as a function of traveltime at a number of locations. The returning signals are digitized and recorded as a function of time (amplitude vs. time).

One prevalent issue with the seismic energy recorded by the detectors during the data acquisition stage is that the seismic traces often contain both the desired seismic reflections (also known as "primary" reflection events or simply "primaries") and unwanted multiple reflections (also known as "multiples") which can obscure or overwhelm the primary seismic reflections. A primary reflection is a sound wave that passes from the source to a detector with a single reflection from a subsurface seismic reflector. A multiple reflection is a wave that has reflected at least three times (up, down and back up again) before being received by a detector. Depending on their time delay from the primary events with which they are associated, multiples are commonly characterized as short-path, implying that they interfere with their own primary reflection, or long-path, where they appear as separate events.

There are a variety of types of multiple events. There are signals which are "trapped" in the water layer between two strong reflectors, the free surface and the bottom of the water layer. There are "pegleg" multiple events, which are reflections that are characterized by an additional roundtrip through the water layer just after emission or just before detection. There are "remaining" surface-related multiple events, where the first and last upward reflections are below the first (water) layer, and there is at least one reflection at the free surface in between. There are also "interbed" multiples which have a downward reflection occurring from a subsurface reflector.

In most cases, multiples do not contain useful information that is not more easily extracted from primaries. Moreover, water-bottom multiples have been recognized as a serious noise problem in seismic data processing in many offshore areas. Multiples can severely mask primary reflection events for structural imaging and contaminate amplitude versus offset ("AVO") information. For these reasons, removal of multiples, or at least attenuation of multiples from the seismic data is an important part of the seismic data processing stage in many environments, particularly in marine settings where multiples are especially strong relative to the primaries. In the case of deep-water data, suppression of first-order and the next few orders of sea-bottom multiple and peg-leg reflections are of great importance. These rather strong multiples may have the same travel time as the primary reflections of target reflectors. In addition to free-surface multiples, interbed multiples have become a more acute problem in many exploration areas where, if misinterpreted, interbed multiples pose a reservoir characterization challenge in terms of both reservoir structure and AVO effects.

There are prior art methods to attenuate surface-related multiples depending on the attributes of the multiples utilized for attenuation. One class of multiple attenuation method consists of the predictive methods where the multiples are predicted from their respective primaries. The prior art predictive multiple attenuation techniques can be generally divided into two categories: (i) model-driven methods and (ii) data-driven methods. Model-driven methods generally use an earth model in addition to the recorded data to predict or simulate multiples utilizing the estimated sea-bottom and sea-surface reflectivity functions and calculated amplitude functions to model water-layer multiple reflections. Those predicted multiples are then subtracted from the original data. Data-driven methods exploit the fact that primaries and multiples are physically related through a convolutional relationship and predict multiples by cross-convolving the relevant primaries thought to contain the stationary phase contributions for multiples. Data-driven methods can generally handle complex geometries and need little or no a priori information about the properties of the subsurface. Model-driven methods are typically computationally cost-effective compared to data-driven methods, while the latter are typically more flexible and requires less analysis and effort by the user.

Some model-driven methods require structural information, i.e., information about the subsurface structure, the determination of which region is the target of doing seismic exploration in the first place. Other model-driven methods require the shape of the source wavelet that, while impulsive, will not be a mathematically idealized delta function because of the water-bubble reverberations and the limited frequency bandwidth of the physical source. Some model-driven methods require both structural and source wavelet information while others use a matching filter to account for an improperly estimated source wavelet. Data-driven techniques are attractive solutions for predicting multiples in complex geologic settings because they do not require any a priori knowledge of the subsurface (reflectivity, structures and velocities). However, these methods are often too costly because they have strong requirements of the seismic acquisition, e.g., require one shot location for each receiver position, and this is too costly to realize in the field for most three dimensional ("3D") acquisition geometries.

SUMMARY

The present invention overcomes the above-described and other shortcomings of the prior art by providing novel and improved methods of predicting interbed multiples based upon primaries which combines features from both model-driven and data-driven methods. It is accomplished by determining a model-driven stationary phase prediction based on an earth model and augmenting that prediction by a data-driven prediction around the stationary phase prediction. It should be appreciated that the model-driven stationary phase prediction can be replaced by an a priori determination, of stationary phase predictions, such as assuming a layered model. Note that no assumption about a target structure is required by the present invention as long as the earth model includes an approximate delineation of the peg-leg and interbed generating interfaces, which are often well above the target structure. In other words, the model-driven stationary phase prediction assumes that the velocity model down to the pegleg-generating interface in addition to rough NMO velocities below the interface should be known.

In accordance with some implementations described below, a computer-implemented method of attenuating interbed multiples in multiply-reflected seismic waves is performed at a computer system having a processor and memory storing one or more program modules to be executed by the processor, the method comprising: providing (i) seismic data comprising a plurality of beams and (ii) an earth model related to a geological volume, wherein the earth model includes an upper interface and a lower interface in the geological volume; selecting a beam in the plurality of beams as an input beam, wherein the input beam is associated with a source and a detector located near a top surface of the geological volume, and wherein the source and the detector are paired for collecting the seismic data; determining at least one of (i) a source-side stationary pegleg arrival between the upper interface and the lower interface and a corresponding detector-side primary beam and (ii) a detector-side stationary pegleg arrival between the upper interface and the lower interface and a corresponding source-side primary beam; predicting an interbed multiples beam between the upper interface and the lower interface using at least one of (i) the detector-side primary beam delayed by the source-side stationary pegleg arrival and (ii) the source-side primary beam delayed by the detector-side stationary pegleg arrival; and deconvolving the predicted interbed multiples beam with the input beam thereby attenuating interbed multiples present in the input beam.

In accordance with some implementations described below, a computer system is provided for attenuating interbed multiples in multiply-reflected seismic waves, the computer system comprising: memory; one or more processors; and one or more program modules stored in the memory, wherein the program modules, when executed by the processors, cause the processors to perform the following instructions: providing (i) seismic data comprising a plurality of beams and (ii) an earth model related to a geological volume, wherein the earth model includes an upper interface and a lower interface in the geological volume; selecting a beam in the plurality of beams as an input beam, wherein the input beam is associated with a source and a detector located near a top surface of the geological volume, and wherein the source and the detector are paired for collecting the seismic data; determining at least one of (i) a source-side stationary pegleg arrival between the upper interface and the lower interface and a corresponding detector-side primary beam and (ii) a detector-side stationary pegleg arrival between the upper interface and the lower interface and a corresponding source-side primary beam; predicting an interbed multiples beam between the upper interface and the lower interface using at least one of (i) the detector-side primary beam delayed by the source-side stationary pegleg arrival and (ii) the source-side primary beam delayed by the detector-side stationary pegleg arrival; and deconvolving the predicted interbed multiples beam with the input beam thereby attenuating interbed multiples present in the input beam.

In accordance with some implementations described below, a non-transitory computer readable storage medium stores one or more program modules for execution by one or more processors of a computer system for attenuating interbed multiples in multiply-reflected seismic waves, the one or more programs including instructions for performing the following operations: providing (i) seismic data comprising a plurality of beams and (ii) an earth model related to a geological volume, wherein the earth model includes an upper interface and a lower interface in the geological volume; selecting a beam in the plurality of beams as an input beam, wherein the input beam is associated with a source and a detector located near a top surface of the geological volume, and wherein the source and the detector are paired for collecting the seismic data; determining at least one of (i) a source-side stationary pegleg arrival between the upper interface and the lower interface and a corresponding detector-side primary beam and (ii) a detector-side stationary pegleg arrival between the upper interface and the lower interface and a corresponding source-side primary beam; predicting an interbed multiples beam between the upper interface and the lower interface using at least one of (i) the detector-side primary beam delayed by the source-side stationary pegleg arrival and (ii) the source-side primary beam delayed by the detector-side stationary pegleg arrival; and deconvolving the predicted interbed multiples beam with the input beam thereby attenuating interbed multiples present in the input beam.

BRIEF DESCRIPTION OF DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

DETAILED DESCRIPTION

Figure 1A:
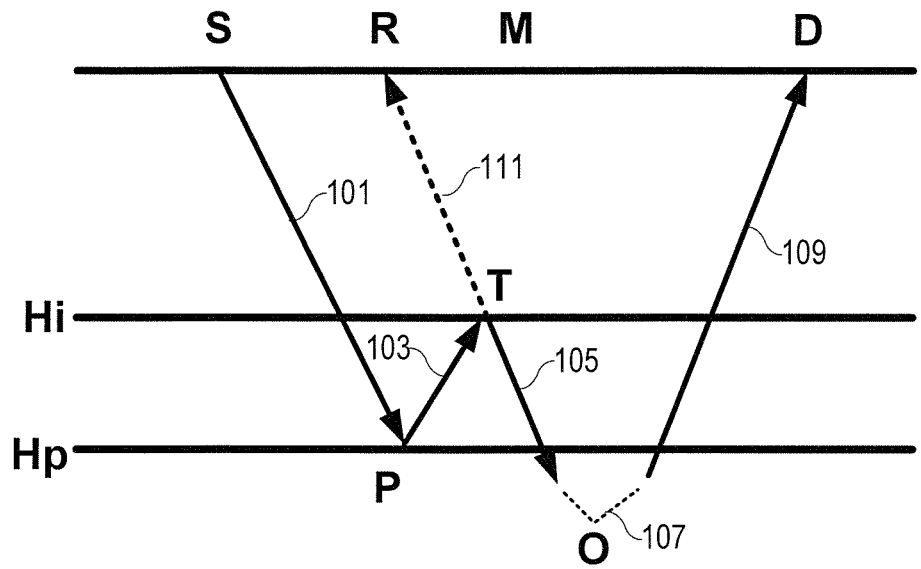
FIGS. 1A and 1B are schematics illustrating different types of interbed multiples-generating interfaces in an earth model in accordance with some implementations.
Figure 1B:
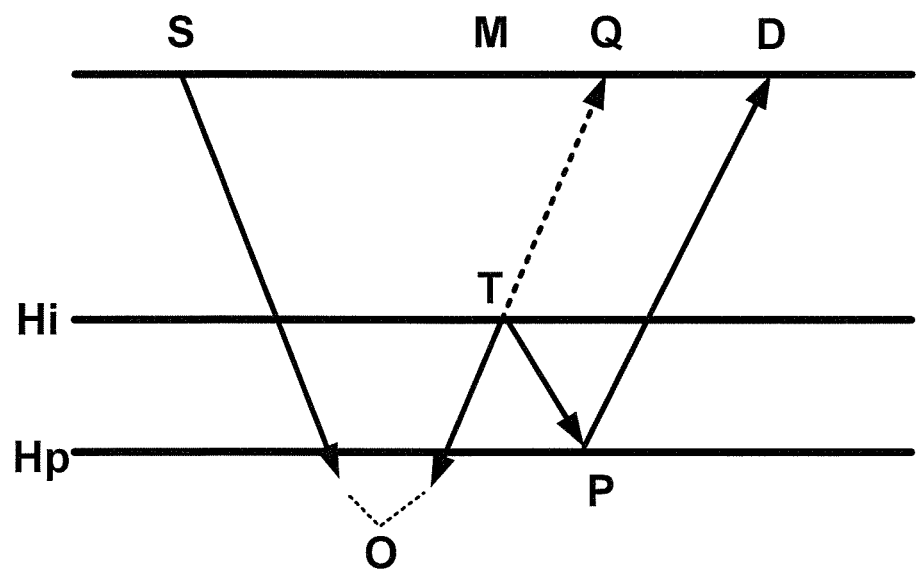

FIG. 1A illustrates a simplified earth model wherein an interbed multiple reflection is generated and received by a detector in accordance with some implementations. For simplicity, the propagation of seismic waves is represented by a multi-segment raypaths through the earth model. In particular, the raypath 101 departs from the source S and propagates downward into the subsurface region of interest. The raypath 101 is reflected at a point P on the interface Hp in the subsurface region and propagates upward. The point P and the interface Hp are, respectively, referred to as "pegleg reflection point" and "pegleg-generating interface" throughout this application. The raypath 103 is then reflected at the point T on the interface Hi and propagates downward again. The point T and the interface Hi are respectively referred to as "interbed reflection point" and "interbed-generating interface" throughout this application. As shown in the figure, the raypath 105 propagates downward and is reflected again after hitting a target structure (as represented by O and 107, respectively). Finally, the raypath 109 arrives at the detector D. Note that FIG. 1B illustrates a similar process except that the pegleg occurs at the detector side rather than the source side. For simplicity, the discussion below focuses on the prediction of interbed multiples caused by source-side peglegs. But it will be apparent to those skilled in the art that the method disclosed herein is equally applicable to the prediction of interbed multiples caused by detector-side peglegs.

According to some implementations, the raypaths associated with the interbed multiple SPTOD is decomposed into (i) a first group of raypaths 101 and 103 and (ii) a second group of raypaths 105, 107, and 109. Note that an upward projection of the raypath 105 produces a raypath 111 that hits a point R on the surface of the earth model. In other words, the interbed multiple SPTOD can be viewed as a primary RTOD defined by the raypaths 111, 105, 107, and 109 after a specific time delay. The time delay associated with the interbed multiple SPTOD is further divided into two components: (i) a positive time delay caused by the traveltime from the source S to the pegleg reflection point P, and then to the interbed reflection point T; and (ii) a negative time delay caused by the traveltime from the interbed reflection point T to the surface point R. Because the negative time delay corresponds to the raypath 111, which is part of the primary RTOD but not part of the interbed multiple SPTOD, it needs to be subtracted from the positive time delay associated with the raypaths 101 and 103. Compared with the conventional data-driven method that requires three primary events for predicting an interbed multiple event, the model-driven method of the present application is significantly more efficient because it only needs one or two primary events with the other primary events replaced with a traveltime calculated through ray tracing in the earth model.

Assuming that the velocity of the earth model shown in FIG. 1A is known, the time delay associated with the interbed multiple SPTOD can be determined through a modified ray tracing algorithm along the raypaths 101, 103, and 111. Generally, a ray tracing algorithm calculates the traveltime from the source S in the time-increasing direction. But since the raypath 111 is not part of the interbed multiple SPTOD, the modified ray tracing algorithm needs to calculate the traveltime along the raypath 111 from T to R in the time-decreasing direction in order to cancel the traveltime along the raypath 111 from R to T in the primary RTOD. In other words, the effect of canceling the traveltime along the raypath 111 from R to T in the primary RTOD is to move the virtual source at the point R from the surface to the interbed reflection point T in the subsurface region. Mathematically, the time delay associated with the interbed multiple SPTOD, time_delay (SPTOD), is described as follows:

$$\text{time\_delay (SPTOD)} = \text{traveltime (SPT)} - \text{traveltime (TR)}$$

where:
traveltime (SPT) represents the raytracing traveltime from S to P and then to T; and
traveltime (TR) represents the raytracing traveltime from T to R.

Figure 2:
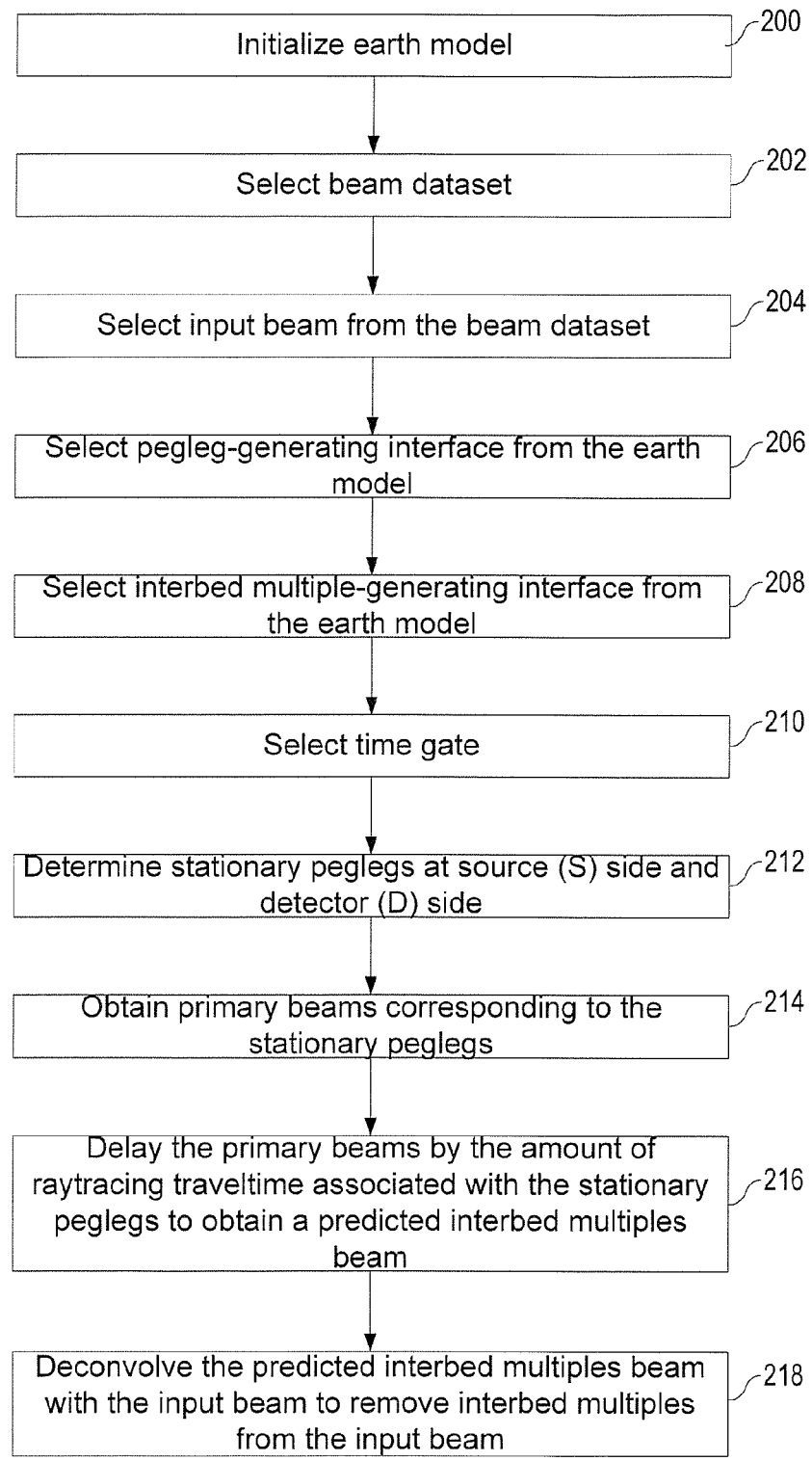
FIG. 2 is a flow chart illustrating a model-driven process of predicting and suppressing interbed multiples from input beams using the earth model in accordance with some implementations.

Using the time delay associated with the interbed multiple SPTOD, the interbed multiple SPTOD can be predicted by moving the primary RTOD along the time axis by the amount of time_delay (SPTOD). FIG. 2 is a flow chart illustrating a model-driven process of predicting and suppressing interbed multiples from input beams using the earth model in accordance with some implementations. First, the process initializes (200) an earth model for the subsurface region of interest. In some implementations, the earth model may be derived from interpreting seismic images of the subsurface region or other types of geological models. The earth model includes one or more multiple-generating interfaces in the subsurface region and the seismic wave propagation velocities of the earth model, which correspond to the respective elastic properties of the subsurface region. There are many well-known methods of determining the seismic wave propagation velocities for a subsurface region, e.g., using the seismic data collected from the subsurface region to perform stacking velocity analysis or tomographic velocity analysis.

Next, the process selects (202) a beam dataset for the subsurface region. In some implementations, the beam dataset is generated by applying a local slant-stacking transform to a plurality of seismic traces collected from the subsurface region. For example, the seismic traces are first organized into common-offset gathers. A common-offset gather of seismic traces is further divided into multiple overlapping patches, each patch having a certain number of seismic traces. Starting with an initial ray parameter, a local slant stack transform is applied to a patch of seismic traces to generate a beam trace located near the center of the patch of seismic traces. In some implementations, a Gaussian distribution of weights centered at the beam trace is applied to the patch of seismic trace when performing the local slant stack transform such that the seismic traces remote from the center of the patch have less contribution to the beam trace than the seismic traces near the center of the patch. Note that there are other seismic data weighting schemes well-known to those skilled in the art. Next, the initial ray parameter is increased by a predefined interval and a new beam trace is generated by performing the local slant stack transform using the updated ray parameter until a predefined ray parameter limit is reached. A more detailed description of how to use a beam dataset generated from the seismic traces using local slant-stacking transform to predict surface-related multiples can be found in U.S. Pat. Nos. 7,715,986 and 8,326,543, both of which are incorporated by reference into the present application in their entirety.

The process selects (204) an input beam from the beam dataset. The input beam includes both primaries and interbed multiples present in the seismic data. One goal of the process is to predict the interbed multiples in the input beam and remove, at least partially, the interbed multiples from the input beam. The interbed multiples-attenuated beam dataset can be further processed to generate, e.g., a more accurate seismic image or velocity model for the subsurface region. From the earth model, the process selects (206, 208) a pegleg-generating interface (e.g., Hp in FIG. 1A) and an interbed multiples-generating interface (e.g., Hi in FIG. 1A), respectively. In some implementations, the physical depths of the pegleg-generating interface and the interbed multiples-generating interface can be used to estimate the arrival time of the interbed multiples in the seismic traces, which may fall into one or more time gates. Accordingly, the process may select (210) one of the time gates and limit the interbed multiples prediction and attenuation to this selected time gate. After selecting a time gate, the process determines (212) the source-side and detector-side stationary peglegs like the ones shown FIGS. 1A and 1B. A stationary pegleg is a pegleg that satisfies the Snell's law for reflection at a multiple-generating surface. A more detailed description of how to determine the stationary peglegs is provided below in connection with FIGS. 3A and 3B. After determining the peglegs, the process obtains (214) the primary beams corresponding to the stationary peglegs. For example, FIG. 1A depicts that there is a primary beam RTOD corresponding to the pegleg SPT and FIG. 1B depicts that there is a primary beam SOTQ corresponding to the pegleg TPD, respectively.

Using the raytracing traveltime associated with the stationary peglegs, the process performs a time delay (216) to the primary beams to obtain a predicted interbed multiples beam. Finally, the process deconvolves (218) the predicted interbed multiples beam with the input beam to remove interbed multiples from the input beam. A more detailed description of the prediction and deconvolution of the interbed multiples with the input beam is provided below in connection with FIG. 3C.

Finding the stationary peglegs at the location P on the pegleg-generating interface Hp of FIG. 1A requires a raypath search. The search includes performing raytracing from the source S using different ray parameters until a predefined condition (e.g., the Snell's law defining the specular reflection) is met. Assuming that the ray parameters at the source S and the detector D are $p_s$ and $p_d$, respectively, it is well-known that the ray parameters at the midpoint M between S and D and the half-offset h between S and D can be defined as:

$$p_m = p_d + p_s,$$

$$p_h = p_d - p_s.$$

The half-offset ray parameter $p_{h\_nmo}$ can also be derived from the normal moveout equation ("NMO"):

$$p_{h\_nmo} = \frac{\partial t}{\partial h} = \frac{\partial}{\partial h}\sqrt{T_0^2 + \left(\frac{2h\cos\theta_m}{V}\right)^2}$$

wherein $T_0$ is the zero-offset traveltime;

V is the NMO velocity;

h is the half offset between the source and detector;

$\theta_m$ is the local inline dip angle of a reflector below the midpoint M; and t is the traveltime corresponding to the half-offset h.

Figure 3A:
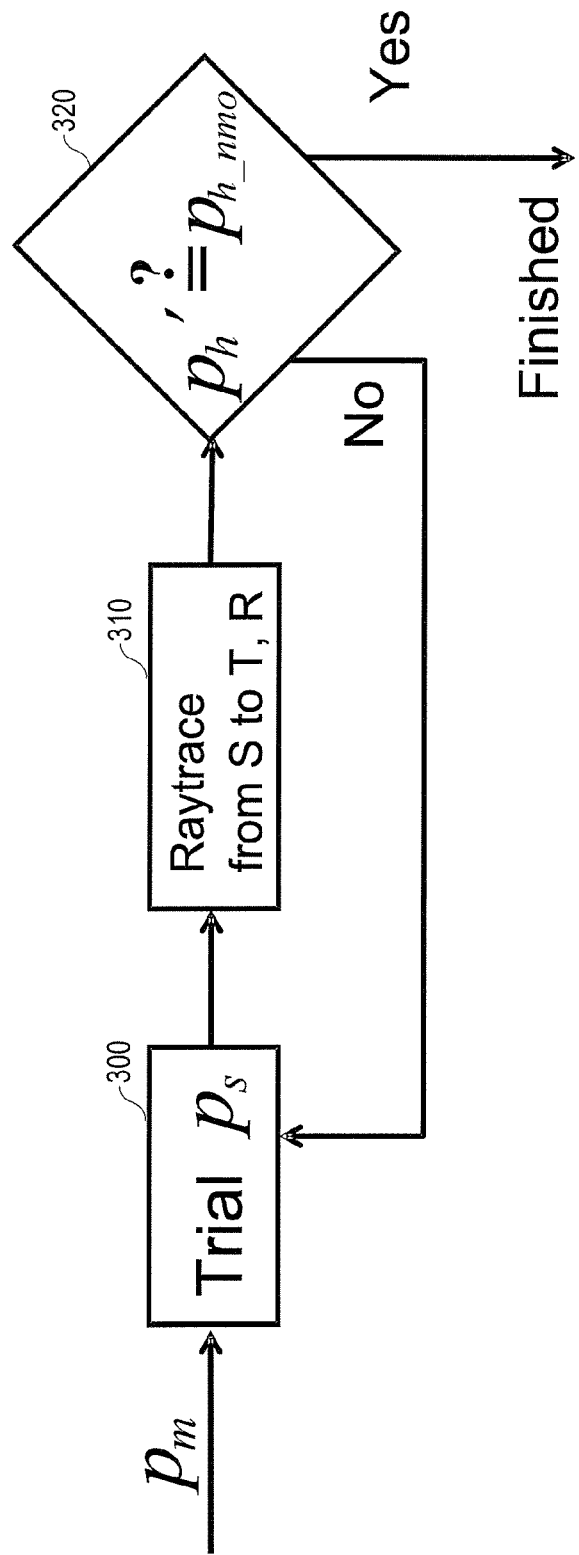
FIG. 3A is a block diagram illustrating a process of determining stationary peglegs using the earth model and input beams in accordance with some implementations.
Figure 3B:
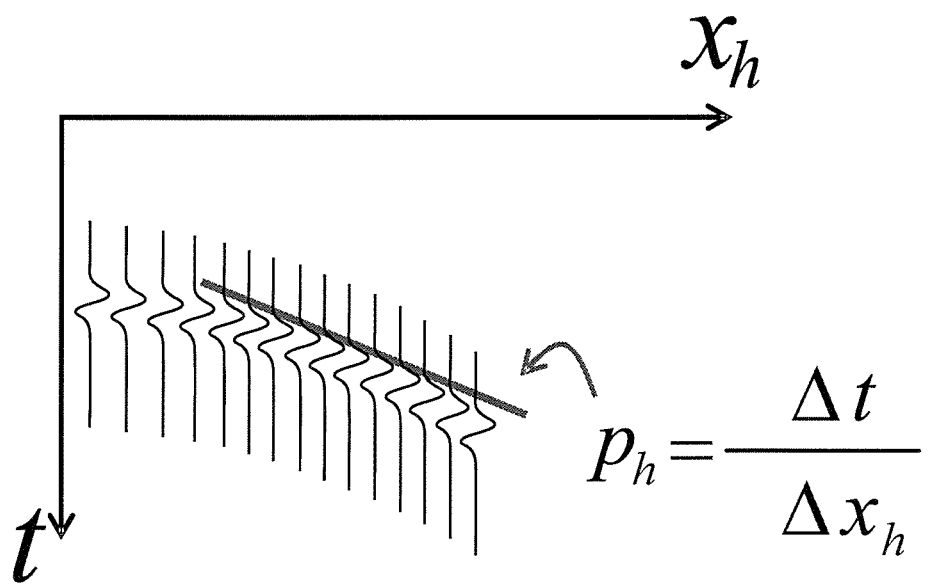
FIG. 3B illustrates a method of determining stationary peglegs implemented in the process of FIG. 3A.

FIG. 3B illustrates the physical meaning of $p_h$, which is the local slope of a seismic event associated with a reflector in the $x_h$-t plot. According to the Snell's law, the beam with the closest match between the $p_h$ determined through raytracing and the $p_{h\_nmo}$ calculated using the NMO equation above is deemed to be the stationary pegleg.

FIG. 3A illustrates a schematic of a process of determining the stationary pegleg shown in FIG. 1A. For a given midpoint ray parameter $p_m$ associated with the input beam, a trial ray parameter $p_s$ is selected (300) to perform raytracing (310) from the source location S to a point P' on the pegleg-generating interface Hp, a point T' on the interbed-generating interface Hi, and a point R' on the surface. The raytraced half-offset ray parameter $p_h'$, which is calculated from the dip of the primary arrivals at point R on the surface, is then compared (320) with $p_{h\_nmo}$. If the raytraced $p_h'$ closely matches the calculated $p_{h\_nmo}$ (e.g., the difference between the two raytracing properties satisfies a predefined threshold), this process is complete and the primary beam associated with points R and D is selected as the detector-side stationary pegleg. Otherwise, another trial direction $p_s$ is chosen and the process is performed again until a satisfactory match between $p_h'$ and $p_{h\_nmo}$ is obtained.

Figure 3C:
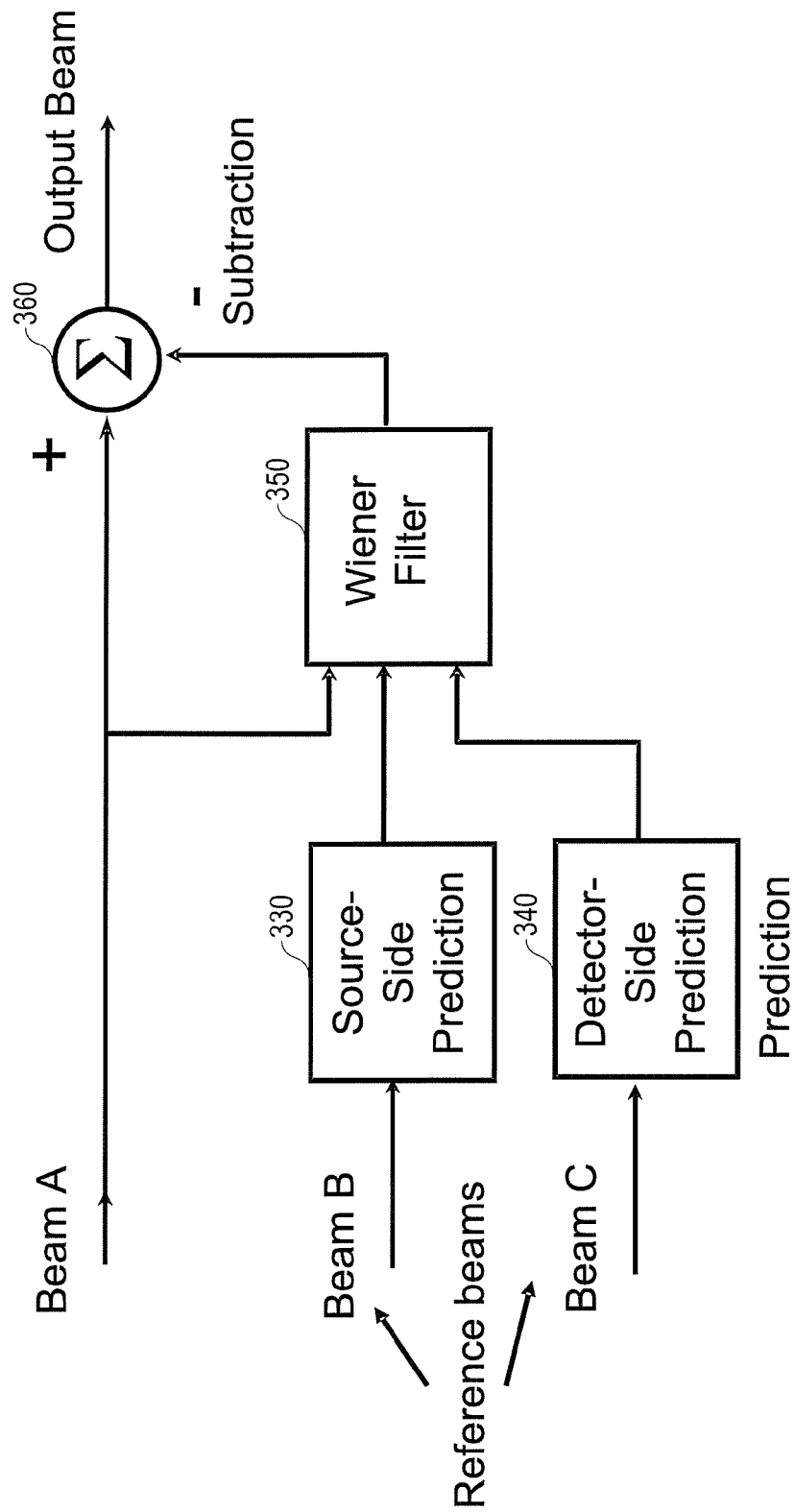
FIG. 3C is a block diagram illustrating a process of predicting and suppressing interbed multiples from a single beam A in accordance with some implementations.

FIG. 3C is a block diagram illustrating a process of predicting and suppressing interbed multiples from a single beam in accordance with some implementations. Using the aforementioned process, a beam B is identified as the source-side prediction 330, and a beam C is identified as the detector-side prediction 340, respectively, for the input beam A. As described above in connection with FIG. 2, both beams B and C are time-delayed primary beams for predicting interbed multiple beams. A Wiener filter 350 is applied to beams A, and time-delayed versions of B and C to generate an estimation of the interbed multiples present in beam A. Wiener filters are known in the art. In general, it is a causal filter which transforms an input into a desired output as closely as possible, subject to certain constraints. Moreover, Wiener filter can accommodate the errors in traveltime calculation caused by inaccuracies in the modeling of the multiple-generating interfaces. As one skilled in the art will appreciate, there are other filters or means that can perform this particular function and they are intended to be within the scope of the present application. Once the interbed multiples in beam A have been determined, the interbed multiples are then removed 360 from beam A through, e.g., a subtraction operation.

Figure 4A:
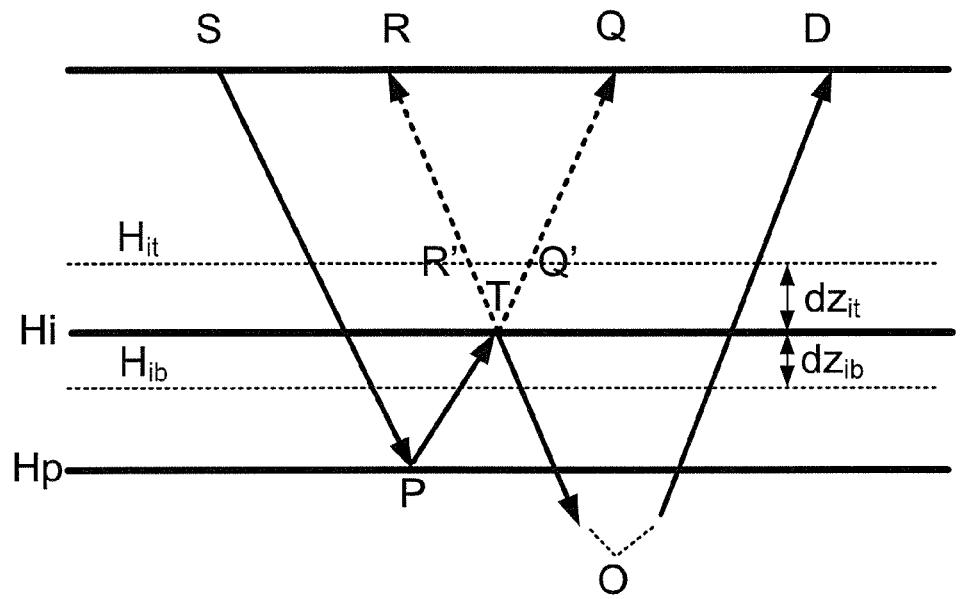
FIGS. 4A and 4B are schematics illustrating different types of interbed multiples-generating multi-layer structures in an earth model in accordance with some implementations.
Figure 4B:
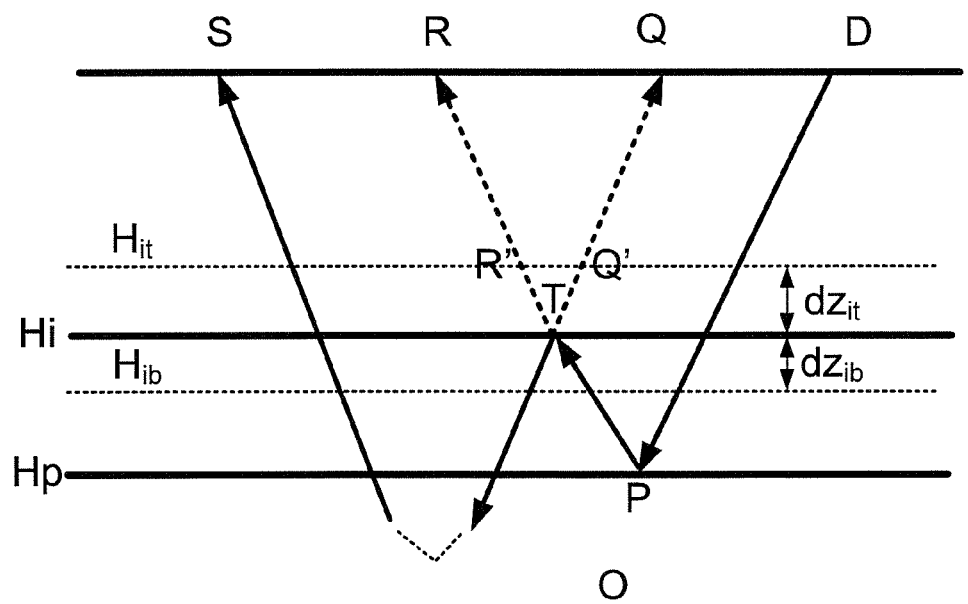

In some implementations, besides a specific interface for generating peglegs or interbed multiples, a multi-layer structure may also be identified in the earth model for generating peglegs or interbed multiples. In this case, the process described above in connection with FIG. 2 needs to be modified to predict and suppress interbed multiples caused by the multi-layer structure. FIGS. 4A and 4B are schematics illustrating different types of interbed multiples-generating multi-layer structures in an earth model in accordance with some implementations.

In particular, FIG. 4A depicts a multi-layer structure that has an upper bound $H_{it}$ and a lower bound $H_{ib}$. The multi-layer structure may include multiple interfaces, each interface capable of generating interbed multiples with the pegleg-generating interface Hp. In some implementations, there is an interface Hi within the multi-layer structure generating interbed multiples. The distance between the interbed multiples-generating interface Hi and the upper bound of the multi-layer structure is $dz_{it}$ and the distance between the interbed multiples-generating interface Hi and the lower bound of the multi-layer structure is $dz_{ib}$. Note that the two distances $dz_{it}$ and $dz_{ib}$ may or may not be the same. In other words, the interbed multiples-generating interface does not have to be right in the middle of the multi-layer structure. Note that FIG. 4B illustrates a similar process except that the pegleg occurs at the detector side rather than the source side. For simplicity, the discussion below focuses on the prediction of interbed multiples caused by source-side peglegs. But it will be apparent to those skilled in the art that the method disclosed herein is equally applicable to the prediction of interbed multiples caused by detector-side peglegs.

Figure 5:
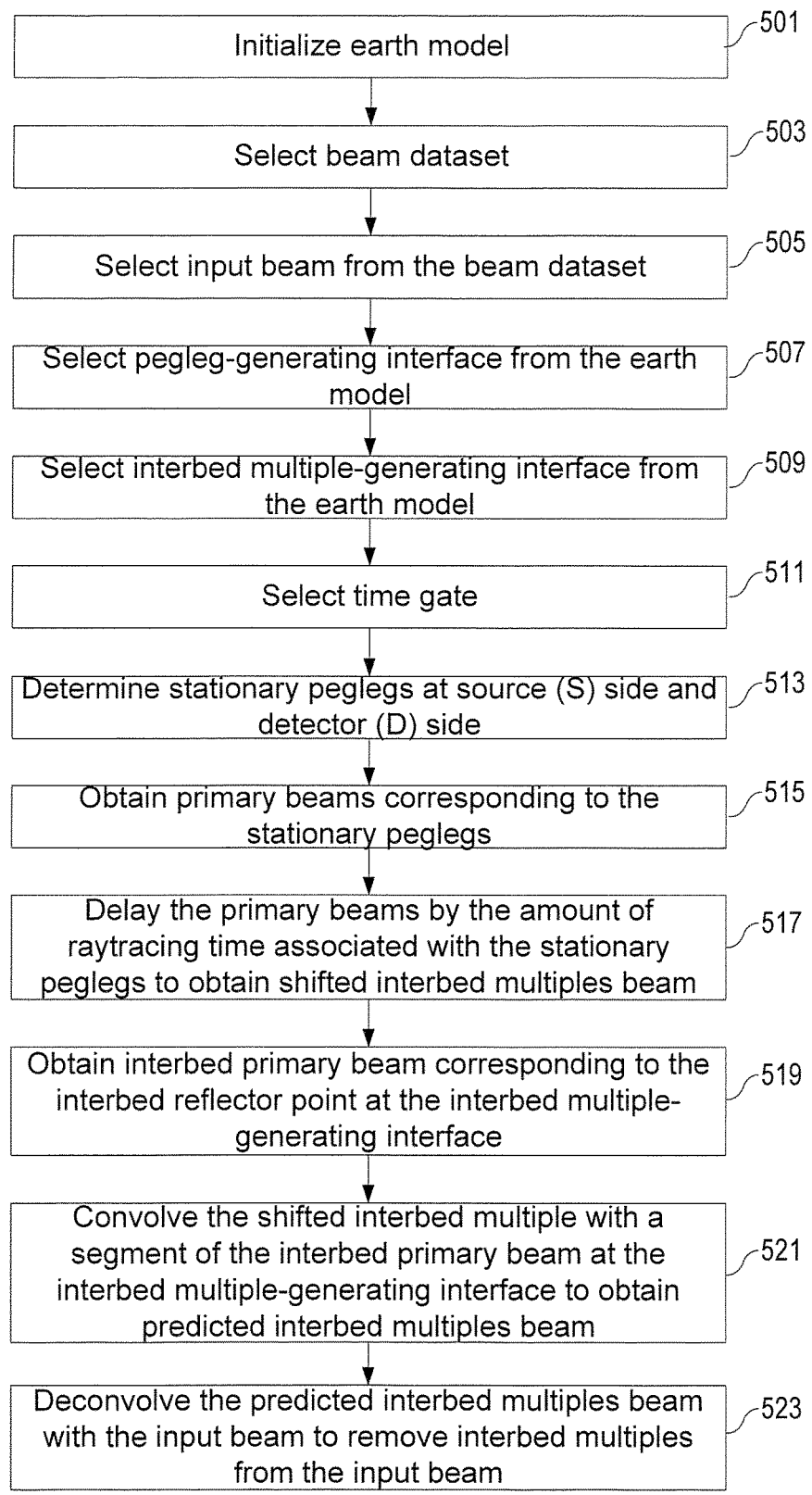
FIG. 5 is a flow chart illustrating a model-driven process of predicting and suppressing interbed multiples from input beams using the multi-layer earth model in accordance with some implementations.

FIG. 5 is a flow chart illustrating a model-driven process of predicting and suppressing interbed multiples from input beams using the multi-layer earth model in accordance with some implementations. Similar to the process shown in FIG. 2, the process includes the following steps: initializing (501) an earth model for the subsurface region of interest; selecting (503) a beam dataset for the subsurface region; selecting (505) an input beam from the beam dataset; selecting (507) a pegleg-generating interface (e.g., Hp in FIG. 4A) from the earth model; selecting (509) an interbed multiples-generating interface (e.g., Hi in FIG. 4A) from the earth model; selecting (511) a time gate; determining (513) the source-side and detector-side stationary peglegs like the ones shown FIGS. 4A and 4B; obtaining (515) the primary beams corresponding to the stationary peglegs; and performing a time delay (517) to the primary beams to obtain a predicted interbed multiples beam. But unlike the process shown in FIG. 2, the process in FIG. 5 also obtains (519) an interbed primary beam (e.g., the one corresponding to the raypaths R'TQ' in FIG. 4A) corresponding to the interbed reflector point T at the interbed multiples-generating interface. This primary beam includes the primary events generated by the multi-layer structure. Next, the processes convolves (521) the time-shifted interbed multiples with a segment of the interbed primary beam (e.g., the one corresponding to the raypaths R'TQ' in FIG. 4A) to obtain a predicted interbed multiple beam. Because the segment of this interbed primary beam used for convolution includes information about the primary events generated by the multi-layer structure, the predicted interbed multiple beam therefore includes information of at least a portion of the multi-layer structure. Finally, the process deconvolves (523) the predicted interbed multiples beam with the input beam to remove interbed multiples from the input beam.

Figure 6A:
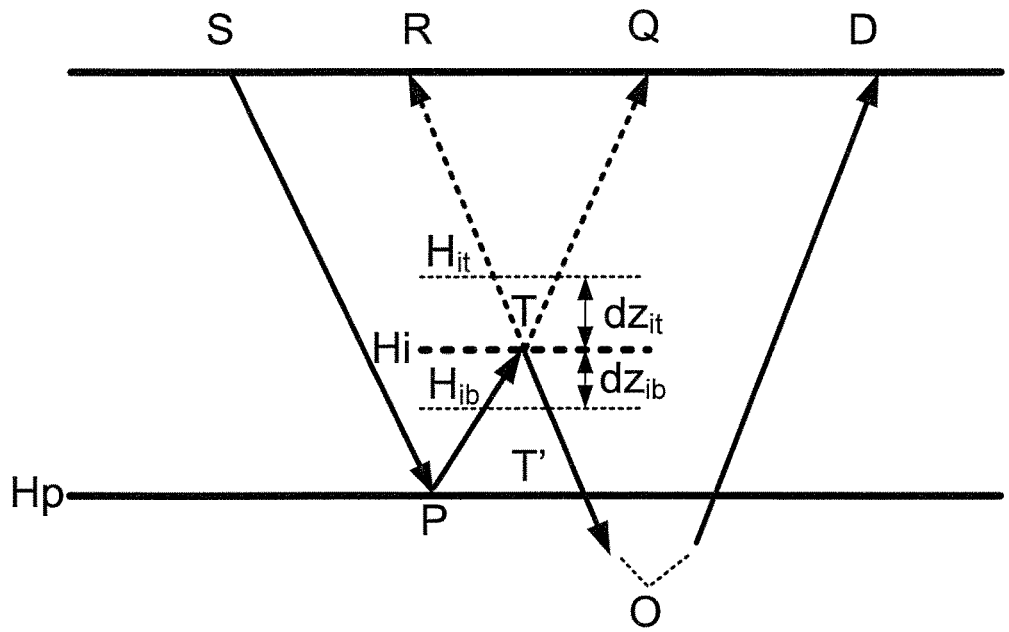
FIGS. 6A to 6D are additional schematics illustrating different types of interbed multiples-generating multi-layer structures in an earth model in accordance with some implementations.

FIGS. 6A to 6D are additional schematics illustrating different types of interbed multiples-generating multi-layer structures in an earth model in accordance with some implementations. As shown in FIG. 6A, when no interbed-generating interface is identified or present in the earth model but interbed multiples are present and need to be predicted, the multi-layer structure with convolutional interbed interfaces described above in connection with FIG. 5 can be reduced to a case where there is a short virtual interbed-generating interface Hi. The virtual interbed-generating interface Hi is defined by input parameters for raytracing. For example, Hi is defined to occur at a certain depth level above Hp. The raytracer determines the depth when this condition is reached as well as the corresponding interbed reflector point T at which the stationary pegleg is found. In this case, the virtual interface Hi conforms to Hp such that the 3D local dip values of T can be that of point P or of the point of T's projection onto Hp when performing raytracing and ray property matching.

Figure 6B:
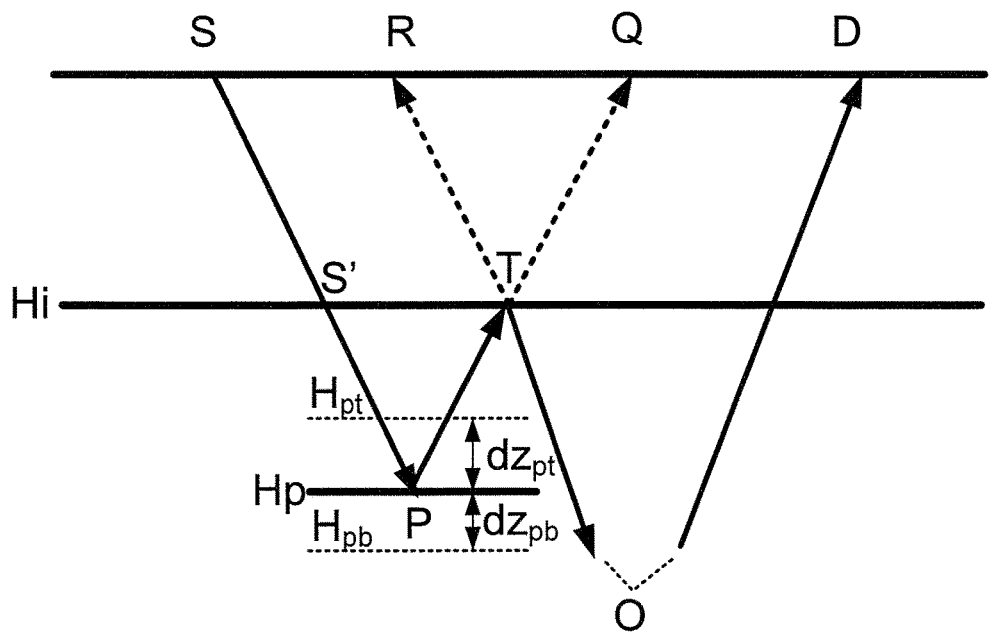

FIG. 6B depicts that the interbed-generating interface Hi is well-defined (such as the water bottom) but the pegleg-generating interfaces are either unmapped or less prominent. In such case, the convolutional virtual pegleg-generating interface Hp and the pegleg-reflector point P can be defined using input parameters for raytracing. For example, Hp is defined to occur at a certain depth level below Hi. The raytracer determines the depth when this condition is reached as well as the corresponding pegleg reflector point P at which the stationary pegleg is found. The virtual interface Hp conforms to the upper and lower bounds $H_{pt}$ and $H_{pb}$ of the multi-layer structure. In some implementations, the virtual interface Hp is initiated when the ray travels to a predefined distance from point S' and the virtual pegleg reflector point P has local properties of those associated with the point S'.

Figure 6C:
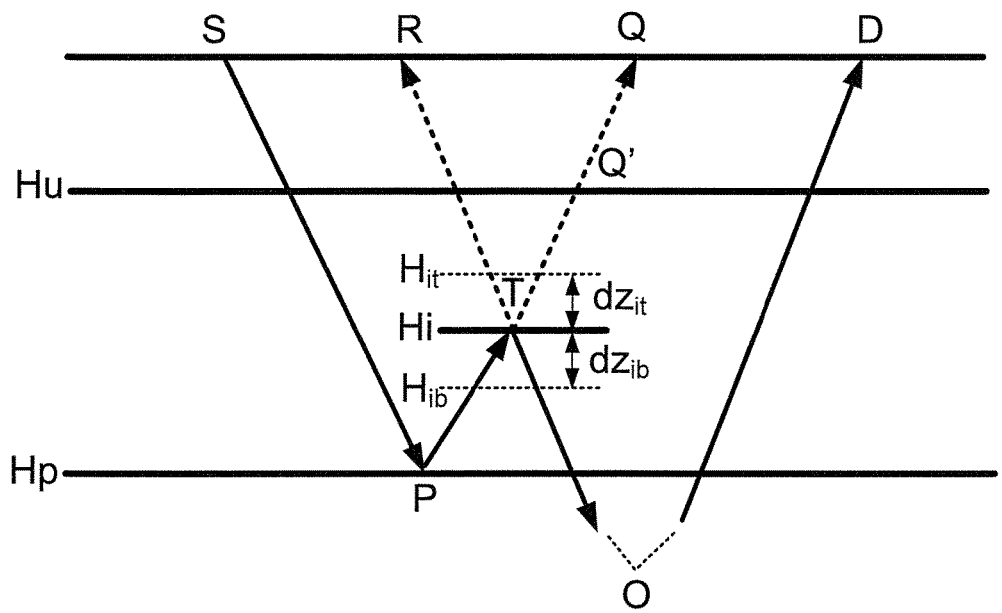

FIG. 6C depicts a case in which interbed multiples are generated within a layer between two strong interfaces, such as water bottom and top salt. In such case, there are additional interbed-generating interfaces within the layer between these two interfaces Hu and Hp. There are multiple layers (possible partially overlapping) between Hu and Hp. The layers are parameterized with a virtual interface Hi. Unlike the previous case, the virtual interface Hi is defined as an average between Hp and Hu. For example, the local dip of point T may be defined by the weighted average of the corresponding points on Hp and Hu for determining the stationary peglegs.

Figure 6D:
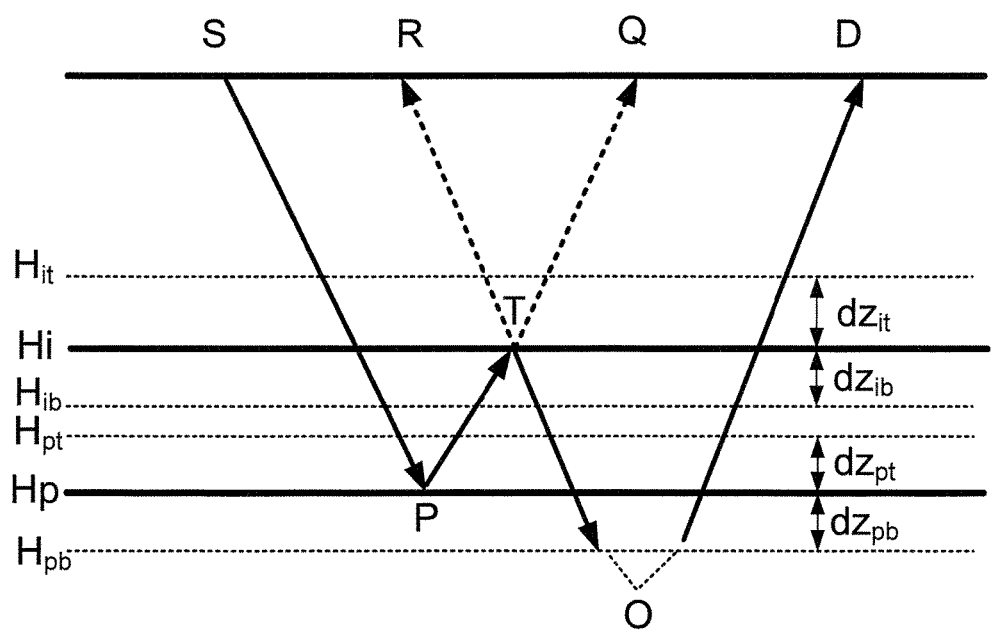

In some implementations, both the pegleg and interbed multiple generating interfaces Hp and Hi are known but each has additional unmapped or less prominent interfaces that generate both pegleg and interbed multiples. In such case, both interfaces can be treated as a convolutional model as illustrated in FIG. 6D.

Figure 7:
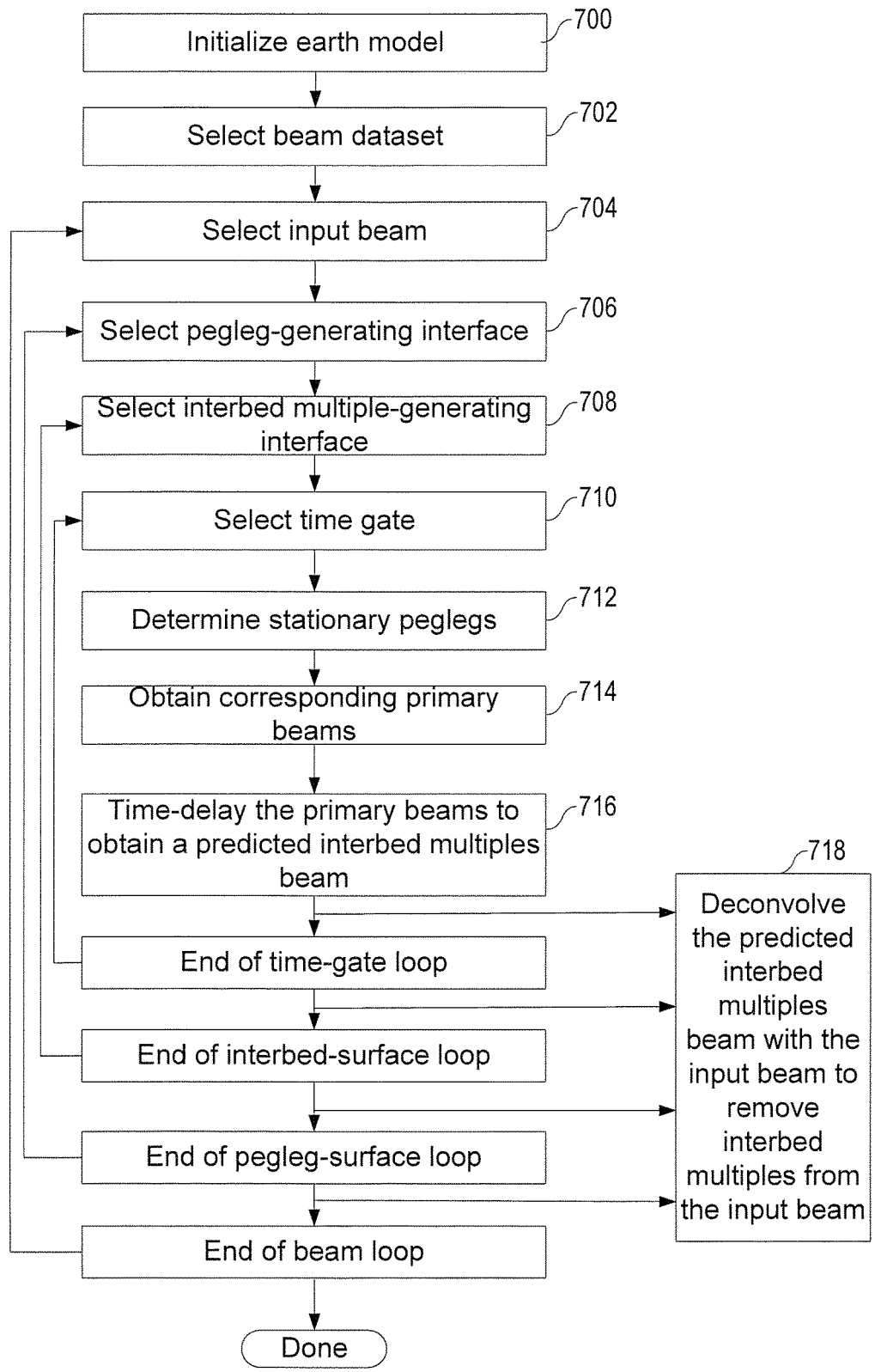
FIG. 7 is a flow chart illustrating another model-driven process of predicting and suppressing interbed multiples from input beams in accordance with some implementations.

FIG. 7 is a flow chart illustrating another model-driven process of predicting and suppressing interbed multiples from input beams in accordance with some implementations. An earth model is initialized 700, which correlates to a specific geological region of interest. A beam dataset that has been determined from seismic data of the geological region of interest is also initiated 702. This embodiment of the present invention includes a series of loops wherein an input beam 704, a pegleg-generating interface 706, an interbed multiple-generating interface 708, and a time gate 710 are selected. Rays are sprayed from a source or detector location on the surface associated with the input beam for determining 712 stationary peglegs. One or more primary beams corresponding to the peglegs are obtained 714, and the primary beams are transformed into a predicted multiples beam 716 by a time shift corresponding to the traveltime of the raypaths associated with the stationary pegleg. In particular, the raypath from the interbed-reflector point to the top surface produces a negative traveltime. The predicted interbed multiples beam is then either accumulated or deconvolved with the input beam to remove the interbed multiples in the input beam 718. The accumulated interbed multiples beams can be used to reconstruct the multiple prediction in the form of seismic traces or be used to deconvolve with the input beam at a later time.

Figure 8:
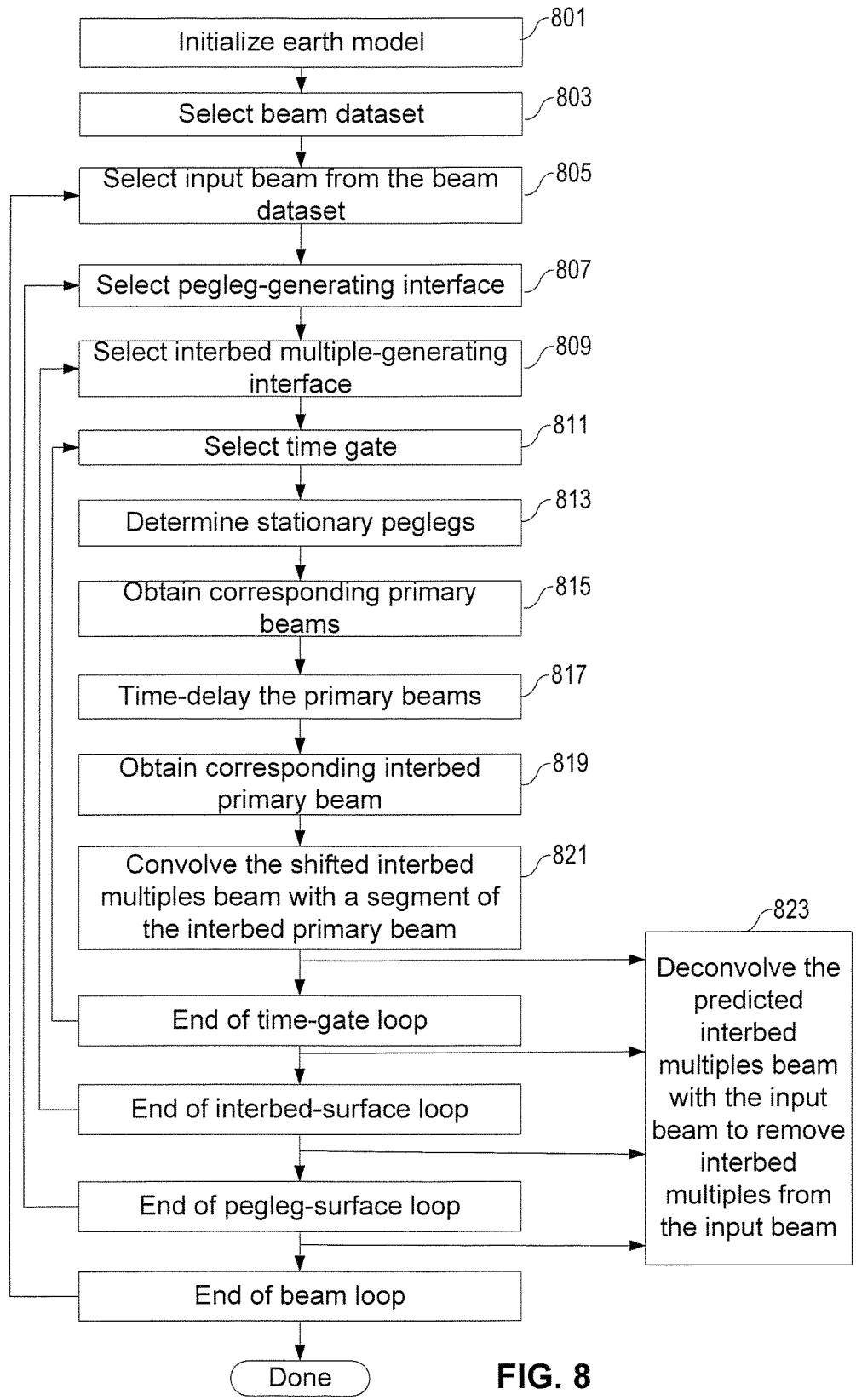
FIG. 8 is a flow chart illustrating yet another model-driven process of predicting and suppressing interbed multiples from input beams in accordance with some implementations.

FIG. 8 is a flow chart illustrating yet another model-driven process of predicting and suppressing interbed multiples from input beams in accordance with some implementations. An earth model is initialized 801, which correlates to a specific geological region of interest. A beam dataset that has been determined from seismic data of the geological region of interest is also initiated 803. This embodiment of the present invention includes a series of loops wherein an input beam 805, a pegleg-generating interface 807, an interbed multiple-generating interface 809, and a time gate 811 are selected. Rays are sprayed from a source or detector location on the surface associated with the input beam for determining 813 stationary peglegs. One or more primary beams corresponding to the peglegs are obtained 815, and the primary beams are transformed into a predicted interbed multiples beam 817 by a time shift corresponding to the traveltime of the raypaths associated with the stationary peglegs. In particular, the raypath from the interbed-reflector point to the top surface produces a negative traveltime. An interbed primary beam related to the predicted interbed multiples beam is then obtained 819. A segment of the interbed primary beam, which corresponds to a multi-layer structure surrounding the interbed multiple-generating interface, is convolved with the time-shifted interbed multiples beam to obtain a convolved interbed multiples beam 821. The convolved interbed multiples beam is then either accumulated or deconvolved with the input beam to remove the multiples in the input beam 823. The accumulated interbed multiples beams can be used to reconstruct the multiple prediction in the form of seismic traces or be used to deconvolve with the input beam at a later time.

Figure 9:
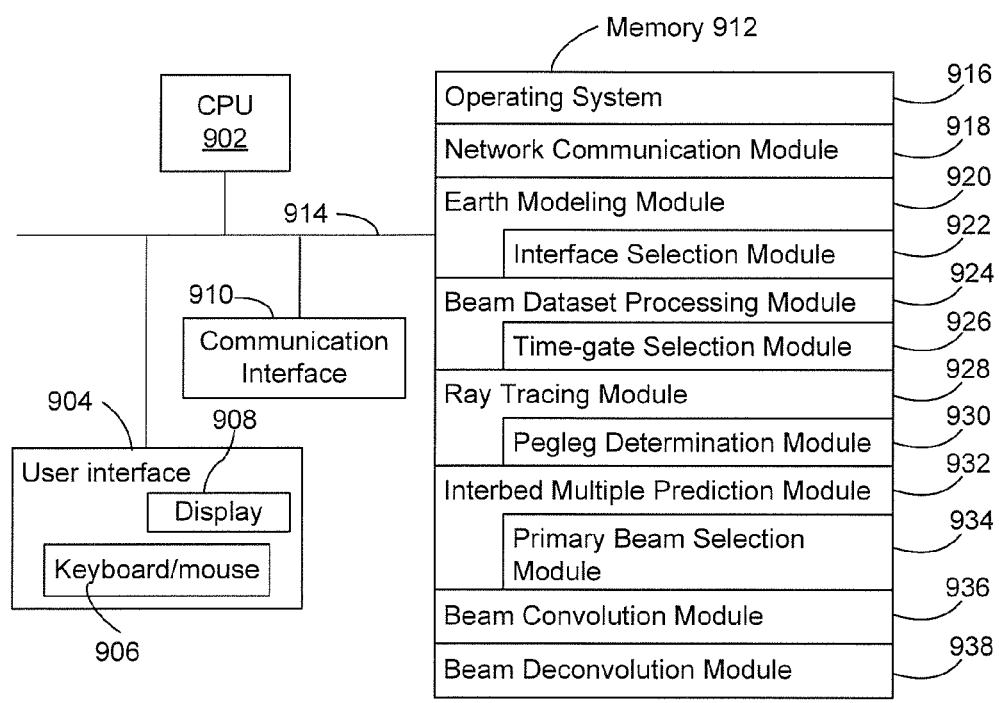
FIG. 9 is a block diagram illustrating a computer system including various program modules for predicting and suppressing interbed multiples from input beams in accordance with some implementations.

FIG. 9 is a block diagram illustrating a computer system 900 including various program modules for predicting and suppressing interbed multiples from input beams in accordance with some implementations. The computer system 900 includes one or more processors 902 for executing modules, program modules and/or instructions stored in memory 912 and thereby performing predefined operations; one or more network or other communications interfaces 910; memory 912; and one or more communication buses 914 for interconnecting these components. In some implementations, the computer system 900 includes a user input interface 904 comprising one or more input devices 906 (e.g., keyboard or mouse). In some implementation, the computer system 900 has a built-in display 908 for displaying the seismic data and velocity model, etc.

In some implementations, the memory 912 includes high-speed random access memory, such as DRAM, SRAM, DDR RAM or other random access solid state memory devices. In some implementations, the memory 912 includes non-volatile memory, such as one or more magnetic disk storage devices, optical disk storage devices, flash memory devices, or other non-volatile solid state storage devices. In some implementations, the memory 912 includes one or more storage devices remotely located from the processor(s) 902. Memory 912, or alternately one or more storage devices (e.g., one or more nonvolatile storage devices) within the memory 912, includes a non-transitory computer readable storage medium. In some implementations, the memory 912 or the computer readable storage medium of the memory 912 stores the following programs, modules and data structures, or a subset thereof:

- an operating system 916 that includes procedures for handling various basic system services and for performing hardware dependent tasks;
- a network communications module 918 for connecting the computer system 900 to other devices (e.g., a data storage device or a printing device) via the communication network interfaces 910 and one or more communication networks (wired or wireless), other wide area networks, local area networks, metropolitan area networks, etc.;
- an earth modeling module 920 configured to obtain an initialized earth model related to the geologic volume of interest. In one implementation, the earth modeling module 920 further includes an interface selection module 922 configured to perform one or more of operations 206, 208, 507, 509, 702, 704, 807, and/or 809 (shown in FIGS. 2, 5, 7 and 8 as described above);
- a beam dataset processing module 924 configured to obtain and process a beam dataset, which may have been derived from seismic data related to the geologic volume of interest, or other data types. The beam dataset includes information describing properties of a plurality of beams of seismic data through the geologic volume of interest. The properties of the plurality of beams described by the beam data set include one or more of the midpoint and offset coordinates of central ray path, reflector dip at the central ray location, trace sequence values associated with the central ray, and/or other properties. The beams described by the beam dataset may be Gaussian beams. In one implementation, the beam dataset module 924 further includes a time gate selection module 926 configured to perform one or more of operations 210, 511, 710, and/or 811 (shown in FIGS. 2, 5, 7 and 8 as described above);
- a ray tracing module 928 configured to trace rays from a given detector or source location to another surface location through the geologic volume of interest. The rays traced by ray tracing module 928 may include rays that reverberate between a pegleg-generating interface and an interbed multiples-generating surface. The given detector or source location from which rays are traced by ray tracing module 928 is the detector or source location that corresponds to the input beam selected by beam dataset processing module 924. In one embodiment, the ray tracing module 928 further includes a pegleg determination module 930 configured to determine properties of one or more pegleg arrivals corresponding to the input beam. The pegleg arrival is determined or selected based on the information in the beam dataset describing properties of the input beam, rays traced by the raytracing module 928, the interface selected by interface selection module 922, stationary phase predictions, and/or other factors. The one or more pegleg arrivals determined by the pegleg determination module 930 may include one or more stationary peglegs associated with the interbed multiples. In one embodiment, the pegleg determination module 930 may perform one or more of operations 212, 513, 712, and/or 813 (shown in FIGS. 2, 5, 7 and 8 as described above);

an interbed multiples prediction module 932 configured to predict interbed multiples using the input beam, rays traced by the raytracing module 928, the interface selected by interface selection module 922, stationary phase predictions, and/or other factors. In one embodiment, the interbed multiples prediction module 932 further includes a primary beam selection module 934 configured to identify a primary beam from the beam dataset obtained by beam dataset processing module 924 that corresponds to the stationary pegleg arrival determined and/or selected by pegleg determination module 930. This identification may be made by comparing properties of the input beams described in the beam dataset with properties of the pegleg arrivals;

a beam convolution modules 936 configured to convolve a time-shifted interbed multiples beam with a segment of interbed primary beam by performing one or more of operations 521 and/or 821 (shown in FIGS. 5 and 8 as described above); and a beam deconvolution modules 938 configured to deconvolve a predicted interbed multiples beam with an input beam by performing one or more of operations 218, 523, 718, and/or 823 (shown in FIGS. 2, 5, 7 and 8 as described above).

In some implementations, the computer system 900 corresponds to a single computer. In some other implementations, the computer system corresponds to a distributed computer system. While particular implementations are described above, it will be understood it is not intended to limit the invention to these particular implementations. On the contrary, the invention includes alternatives, modifications and equivalents that are within the spirit and scope of the appended claims. Numerous specific details are set forth in order to provide a thorough understanding of the subject matter presented herein. In other instances, well-known methods, procedures, components, and circuits have not been described in detail so as not to unnecessarily obscure aspects of the implementations.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A computer-implemented method of attenuating interbed multiples in multiply-reflected seismic waves, the method comprising:

at a computer system having a processor and memory storing one or more program modules to be executed by the processor:
providing (i) seismic data comprising a plurality of beams and (ii) an earth model related to a geological volume, wherein the earth model includes an upper interface and a lower interface in the geological volume;

selecting a beam in the plurality of beams as an input beam, wherein the input beam is associated with a source and a detector located near a top surface of the geological volume, and wherein the source and the detector are paired for collecting the seismic data;

determining at least one of (i) a source-side stationary pegleg arrival between the upper interface and the lower interface and a corresponding detector-side primary beam and (ii) a detector-side stationary pegleg arrival between the upper interface and the lower interface and a corresponding source-side primary beam, wherein determining the source-side stationary pegleg arrival between the upper and lower interfaces and the corresponding detector-side primary beam further includes:

performing a raytracing between the source, a pegleg reflection point on the lower interface, an interbed reflection point on the upper interface, and a predefined location on the top surface using a source ray parameter;

identifying a difference between (i) the raytracing property at the predefined location and (ii) a predefined raytracing property derived from the seismic data associated with the predefined location;

if the difference satisfies a predefined threshold:
determining the source-side stationary pegleg arrival between the upper and lower interfaces in accordance with the raytracing result; and
identifying, among the beams, a beam between the predefined location on the top surface and the detector as the corresponding detector-side primary beam;

if the difference does not satisfy the predefined threshold:
repeating the raytracing and identifying steps using an updated source ray parameter;

predicting an interbed multiples beam between the upper interface and the lower interface using at least one of (i) the detector-side primary beam delayed by the source-side stationary pegleg arrival and (ii) the source-side primary beam delayed by the detector-side stationary pegleg arrival; and deconvolving the predicted interbed multiples beam with the input beam thereby attenuating interbed multiples present in the input beam.

2. The method of claim 1, wherein determining the source-side stationary pegleg arrival between the upper and lower interfaces in accordance with the raytracing result further includes subtracting a raytracing traveltime from the interbed reflection point to the predefined location on the top surface from a raytracing traveltime from the source to the pegleg reflection point and then the interbed reflection point.

3. The method of claim 1, wherein the upper interface represents a multi-layer structure in the geological volume and the upper interface is located between a top and a bottom of the multi-layer structure, the method further comprising:
before deconvolving the predicted interbed multiples beam with the input beam:
identifying, among the plurality of beams, an interbed primary beam between a top surface of the geological volume and the upper interface;
determining a segment of the interbed primary beam between the top of the multi-layer structure and the upper interface; and
convolving the predicted interbed multiples beam with the determined segment of the interbed primary beam.

4. The method of claim 3, wherein the interbed primary beam corresponds to an interbed reflection point on the upper interface.

5. The method of claim 3, wherein the interbed primary beam is related to the source-side primary beam and the detector-side primary beam.

6. The method of claim 1, wherein the lower interface represents a multi-layer structure in the geological volume and the lower interface is located between a top and a bottom of the multi-layer structure, the method further comprising:
before deconvolving the predicted interbed multiples beam with the input beam:
identifying, among the plurality of beams, a pegleg primary beam between a top surface of the geological volume and the lower interface;
determining a segment of the pegleg primary beam between the top of the multi-layer structure and the lower interface; and
convolving the predicted interbed multiples beam with the determined segment of the pegleg primary beam.

7. The method of claim 1, wherein a beam in the plurality of beams is generated by applying a local slant-stacking transform to a plurality of seismic traces.

8. The method of claim 7, wherein the plurality of seismic traces is a portion of a common-offset gather of seismic traces.

9. The method of claim 7, wherein the local slant-stacking transform of the plurality of seismic traces further includes applying a Gaussian distribution of weights to the plurality of seismic traces.

10. A computer system for attenuating interbed multiples in multiply-reflected seismic waves, the computer system comprising:
memory;
one or more processors; and
one or more program modules stored in the memory, wherein the program modules, when executed by the processors, cause the processors to perform the following instructions:
providing (i) seismic data comprising a plurality of beams and (ii) an earth model related to a geological volume, wherein the earth model includes an upper interface and a lower interface in the geological volume;
selecting a beam in the plurality of beams as an input beam, wherein the input beam is associated with a source and a detector located near a top surface of the geological volume, and wherein the source and the detector are paired for collecting the seismic data;
determining at least one of (i) a source-side stationary pegleg arrival between the upper interface and the lower interface and a corresponding detector-side primary beam and (ii) a detector-side stationary pegleg arrival between the upper interface and the lower interface and a corresponding source-side primary beam, wherein the instruction for determining the source-side stationary pegleg arrival between the upper and lower interfaces and the corresponding detector-side primary beam further includes instructions for:
performing a raytracing between the source, a pegleg reflection point on the lower interface, an interbed reflection point on the upper interface, and a predefined location on the top surface using a source ray parameter;

identifying a difference between (i) the raytracing property at the predefined location and (ii) a predefined raytracing property derived from the seismic data associated with the predefined location;

if the difference satisfies a predefined threshold:
determining the source-side stationary pegleg arrival between the upper and lower interfaces in accordance with the raytracing result; and identifying, among the beams, a beam between the predefined location on the top surface and the detector as the corresponding detector-side primary beam;

if the difference does not satisfy predefined threshold:
repeating the raytracing and identifying using an updated source ray parameter predicting an interbed multiples beam between the upper interface and the lower interface using at least one of (i) the detector-side primary beam delayed by the source-side stationary pegleg arrival and (ii) the source-side primary beam delayed by the detector-side stationary pegleg arrival; and deconvolving the predicted interbed multiples beam with the input beam thereby attenuation interbed multiples present in the input beam.

11. The computer system of claim 10, wherein the instructions for determining the source-side stationary pegleg arrival between the upper and lower interfaces in accordance with the raytracing result further includes instructions for subtracting a raytracing traveltime from the interbed reflection point to the predefined location on the top surface from a raytracing traveltime from the source to the pegleg reflection point and then the interbed reflection point.

12. The computer system of claim 10, wherein the upper interface represents a multi-layer structure in the geological volume and the upper interface is located between a top and a bottom of the multi-layer structure, and the program modules further include instructions for:

before deconvolving the predicted interbed multiples beam with the input beam:
identifying, among the plurality of beams, an interbed primary beam between a top surface of the geological volume and the upper interface;
determining a segment of the interbed primary beam between the top of the multi-layer structure and the upper interface; and
convolving the predicted interbed multiples beam with the determined segment of the interbed primary beam.

13. The computer system of claim 10, wherein the lower interface represents a multi-layer structure in the geological volume and the lower interface is located between a top and a bottom of the multi-layer structure, and the program modules further include instructions for:

before deconvolving the predicted interbed multiples beam with the input beam:
identifying, among the plurality of beams, a pegleg primary beam between a top surface of the geological volume and the lower interface;
determining a segment of the pegleg primary beam between the top of the multi-layer structure and the lower interface; and
convolving the predicted interbed multiples beam with the determined segment of the pegleg primary beam.

14. The computer system of claim 10, wherein a beam in the plurality of beams is generated by applying a local slant-stacking transform to a plurality of seismic traces.

15. A non-transitory computer readable storage medium, storing one or more program modules for execution by one or more processors of a computer system for attenuating interbed multiples in multiply-reflected seismic waves, the one or more programs including instructions for performing the following operations:

providing (i) seismic data comprising a plurality of beams and (ii) an earth model related to a geological volume, wherein the earth model includes an upper interface and a lower interface in the geological volume;

selecting a beam in the plurality of beams as an input beam, wherein the input beam is associated with a source and a detector located near a top surface of the geological volume, and wherein the source and the detector are paired for collecting the seismic data;

determining at least one of (i) a source-side stationary pegleg arrival between the upper interface and the lower interface and a corresponding detector-side primary beam and (ii) a detector-side stationary pegleg arrival between the upper interface and the lower interface and a corresponding source-side primary beam, wherein the instructions for determining the source-side stationary pegleg arrival between the upper and lower interfaces and the corresponding detector-side primary beam further includes instructions for:

performing a raytracing between the source, a pegleg reflection point on the lower interface, an interbed reflection point on the upper interface, and a predefined location on the top surface using a source ray parameter;

identifying a difference between (i) the raytracing property at the predefined location and (ii) a predefined raytracing property derived from the seismic data associated with the predefined location;

if the difference satisfies a predefined threshold:
determining the source-side stationary pegleg arrival between the upper and lower interfaces in accordance with the raytracing result; and identifying, among the beams, a beam between the predefined location on the top surface and the detector as the corresponding detector-side primary beam;

if the difference does not satisfy the predefined threshold:
repeating the raytracing and identifying using an updated source ray parameter predicting an interbed multiples beam between the upper interface and the lower interface using at least one of (i) the detector-side primary beam delayed by the source-side stationary pegleg arrival and (ii) the source-side primary beam delayed by the detector-side stationary pegleg arrival; and deconvolving the predicted interbed multiples beam with the input beam thereby attenuating interbed multiples present in the input beam.

16. The non-transitory computer readable storage medium of claim 15, wherein the upper interface is an equivalent representation of a multi-layer structure in the geological volume and the upper interface is located between a top and a bottom of the multi-layer structure, and the program modules further include instructions for:

before deconvolving the predicted interbed multiples beam with the input beam:
- identifying, among the plurality of beams, an interbed primary beam between a top surface of the geological volume and the upper interface;
- determining a segment of the interbed primary beam between the top of the multi-layer structure and the upper interface; and
- convolving the predicted interbed multiples beam with the determined segment of the interbed primary beam.

17. The non-transitory computer readable storage medium of claim 15, wherein the lower interface represents a multi-layer structure in the geological volume and the lower interface is located between a top and a bottom of the multi-layer structure, and the program modules further include instructions for:

before deconvolving the predicted interbed multiples beam with the input beam:
- identifying, among the plurality of beams, a pegleg primary beam between a top surface of the geological volume and the lower interface;
- determining a segment of the pegleg primary beam between the top of the multi-layer structure and the lower interface; and
- convolving the predicted interbed multiples beam with the determined segment of the pegleg primary beam.

18. The non-transitory computer readable storage medium of claim 15, wherein a beam in the plurality of beams is generated by applying a local slant-stacking transform to a plurality of seismic traces.

* * * * *